US008838368B2

(12) United States Patent
Mitsui et al.

(10) Patent No.: US 8,838,368 B2
(45) Date of Patent: Sep. 16, 2014

(54) DEVICE AND METHOD FOR CONTROLLING TIMING AT WHICH IGNITION IS STOPPED WHEN INTERNAL COMBUSTION ENGINE BECOMES STOPPED

(75) Inventors: Atsushi Mitsui, Wako (JP); Michiaki Karube, Wako (JP); Tomoharu Hozumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 694 days.

(21) Appl. No.: 13/133,392

(22) PCT Filed: Dec. 1, 2009

(86) PCT No.: PCT/JP2009/006519
§ 371 (c)(1),
(2), (4) Date: Aug. 10, 2011

(87) PCT Pub. No.: WO2010/067536
PCT Pub. Date: Jun. 17, 2010

(65) Prior Publication Data
US 2011/0288753 A1   Nov. 24, 2011

(30) Foreign Application Priority Data

Dec. 9, 2008   (JP) .................................. 2008-313561

(51) Int. Cl.
*G06F 19/00* (2011.01)
*G06G 7/70* (2006.01)
(Continued)

(52) U.S. Cl.
CPC ................ *F02P 5/1504* (2013.01); *F02D 9/02* (2013.01); *F02N 2019/008* (2013.01); *F02D 11/105* (2013.01); *Y02T 10/46* (2013.01); *F02N 19/005* (2013.01); *F02D 2009/0247* (2013.01); *F02D 2041/0095* (2013.01); *F01L 2800/03* (2013.01); *F02D 41/042* (2013.01); *F02D 37/02* (2013.01); *F02P 9/00* (2013.01); *F02D 2200/1012* (2013.01); *F02D 41/0002* (2013.01)
USPC .... 701/112; 701/110; 123/179.4; 123/406.52

(58) Field of Classification Search
CPC .......... F02D 41/042; F02D 2009/0245; F02D 2009/0247

USPC .......... 701/103, 110, 112; 123/179.4, 406.12, 123/406.24, 406.25, 406.41, 406.45, 123/406.46, 406.47, 406.52
See application file for complete search history.

(56) References Cited

U.S. PATENT DOCUMENTS 7,047,126 B2 * 5/2006 Lewis ........................... 701/112
(Continued)

FOREIGN PATENT DOCUMENTS

DE       19848368  A1    4/2000
(Continued)

OTHER PUBLICATIONS

PCT International Preliminary Report on Patentability application No. PCT/JP2009/006519 dated Jul. 14, 2011.
(Continued)

*Primary Examiner* — Erick Solis
*Assistant Examiner* — Anthony L Bacon
(74) *Attorney, Agent, or Firm* — Squire Patton Boggs (US) LLP

(57) ABSTRACT

A control device for stopping an engine, configured in such a manner that, when, after the ignition of the engine is turned off, the throttle valve is opened to introduce air in order to avoid that a piston stops near the top dead center, the control device stops the engine without causing a misalignment of the stop position of the piston and without degrading emission quality. A device for controlling the timing at which ignition is stopped when an internal combustion engine becomes stopped is provided with: a means for sending, depending on the rotational speed (NE) of the internal combustion engine detected by a rotational speed sensor decreasing to a level lower than or equal to a predetermined value (Np) after the ignition (55) is turned off and the throttle valve (14) is closed, a signal to an actuator (18) so that the throttle valve (14) is opened in order to control the stop position of a piston; and also provided with a means for stopping the ignition of the ignition plug when the throttle valve (14) becomes opened in order to control the stop position of the piston.

12 Claims, 3 Drawing Sheets

(51) Int. Cl.
*F02D 9/02* (2006.01)
*F02D 11/10* (2006.01)
*F02P 5/15* (2006.01)
*F02D 41/04* (2006.01)
*F02D 37/02* (2006.01)
*F02N 19/00* (2010.01)
*F02D 41/00* (2006.01)
*F02P 9/00* (2006.01)

(56) References Cited

U.S. PATENT DOCUMENTS

| | | | |
|---|---|---|---|
| 7,079,941 B2 * | 7/2006 | Tetsuno et al. | 701/112 |
| 7,317,984 B2 * | 1/2008 | Lewis | 701/112 |
| 2002/0043243 A1 | 4/2002 | Majima | |
| 2004/0216719 A1 * | 11/2004 | Condemine et al. | 123/406.47 |
| 2005/0109302 A1 * | 5/2005 | Tetsuno et al. | 123/179.5 |
| 2006/0052930 A1 * | 3/2006 | Froloff et al. | 701/103 |
| 2007/0113803 A1 * | 5/2007 | Froloff et al. | 123/90.11 |
| 2007/0199533 A1 * | 8/2007 | Takahashi | 123/179.4 |

FOREIGN PATENT DOCUMENTS

| | | |
|---|---|---|
| EP | 1367246 A1 | 12/2003 |
| EP | 1413727 A1 | 4/2004 |
| GB | 2431733 A | 5/2007 |
| JP | 06-307264 | 11/1994 |
| JP | 10-299631 | 11/1998 |
| JP | 2000-213375 | 8/2000 |
| JP | 2003-155940 | 5/2003 |
| JP | 2003-176772 | 6/2003 |
| JP | 2004-232539 | 8/2004 |
| JP | 2004-293474 | 10/2004 |
| JP | 2005-320909 A | 11/2005 |
| JP | 2006-161785 | 6/2006 |
| JP | 2007-063997 | 3/2007 |
| JP | 2007-315316 | 12/2007 |
| JP | 2008-180093 | 8/2008 |

OTHER PUBLICATIONS

International Search Report dated Jan. 12, 2010 corresponding to International Application No. PCT/JP2009/006519.

Supplementary European Search Report for EP Application No. 09831644.1, Dated Jun. 12, 2012.

* cited by examiner

DEVICE AND METHOD FOR CONTROLLING TIMING AT WHICH IGNITION IS STOPPED WHEN INTERNAL COMBUSTION ENGINE BECOMES STOPPED

TECHNICAL FIELD

The present invention relates to a device and a method for controlling the timing of stopping ignition when an internal combustion engine is being stopped.

BACKGROUND ART

In an internal combustion engines such as a Diesel engine and a gasoline engine, even if combustion is stopped in a combustion chamber, a piston performs reciprocal motion tens of times until inertia of the piston is consumed by friction, thereby vibrating an engine. Conventionally, in order to reduce the vibration, a throttle valve on an intake air passage is completely closed when the engine is being stopped. However, when the throttle valve is completely closed to close the intake air passage, a large negative pressure is generated in the intake air passage because the piston continues reciprocal motion for a while after combustion is stopped. In this condition, because the air amount in the cylinder is reduced in a compression stroke, the piston receives reduced resistance against inertia energy of the reciprocal motion of the piston. Therefore, the piston moved by inertia tends to stop near the top dead center.

Japanese Patent Publication Laid-Open No. 2000-213375 (Patent Document 1) describes that, when the piston stopped near the top dead center, a crank arm and a crank rod are arranged in tandem, and a large torque is required to move the piston, and therefore startability of the engine is degraded. Therefore, Patent Document 1 proposes that the throttle valve is slightly opened to weaken the negative pressure in the intake air passage when an engine revolving speed is lower than a predetermined value due to the inertia during stopping of the engine.

Japanese Patent Publication Laid-Open No. 06-307264 (Patent Document 2) describes about stopping ignition signals when the engine revolving speed becomes a predetermined value or less in stopping the engine.

Japanese Patent No. 4066642 (Patent Document 3) describes that, in stopping an engine, after fuel injection is stopped, ignition control is continued until a fuel cycle elapses at least two times in each cylinder. Thus, production of un-combusted fuel is prevented, which otherwise flows into an exhaust system.

Japanese Patent Publication Laid-Open No. 2007-63997 (Patent Document 4) describes that ignition timing is retarded responsive to change in pressure in the intake pipe during deceleration of a vehicle to prevent the engine revolving speed from blowing up. Japanese Patent No. 3321021 (Patent Document 5) and Japanese Patent Publication Laid-Open No. 2003-176772 (Patent Document 6) disclose feedback control for advancing and retarding the ignition timing.

PRIOR ART DOCUMENTS

Patent Documents

Patent Document 1: Japanese Patent Publication Laid-Open No. 2000-213375
Patent Document 2: Japanese Patent Publication Laid-Open No. 06-307264
Patent Document 3: Japanese Patent No. 4066642
Patent Document 4: Japanese Patent Publication Laid-Open No. 2007-63997
Patent Document 5: Japanese Patent No. 3321021

DISCLOSURE OF THE INVENTION

Problem to be Solved by the Invention

The inventor found a phenomenon that, after the ignition is turned off, when the throttle valve is opened to introduce air in order to prevent the piston from being stopped at the top dead center, the position cannot stop at the target stopping position because the fuel adhered to the intake pipe and cylinder makes combustion as air is introduce.

Accordingly, there is a need for a technology for stopping the piston at a target stopping position such that the engine is stopped without degrading the emission.

Means for Solving the Problem

A device for controlling a timing of stopping ignition when internal combustion engine is to be stopped, of the present invention, includes a throttle valve that controls an intake air amount of the internal combustion engine; an actuator that drives the throttle valve; a revolving speed sensor that detects a revolving speed of the internal combustion engine; and an electronic control unit that controls the internal combustion engine.

The electronic control unit includes: means for transmitting a signal for opening the throttle valve to the actuator in order to control a piston stopping position in response to a command for stopping an internal combustion engine; and means for stopping ignition of an ignition plug when the throttle valve is opened in order to control the piston stopping position.

According to the configuration, after the command for stopping the engine is issued, for example, after the ignition switch is turned off to issue the command for stopping the engine from the electronic control unit, the throttle valve is opened before the internal combustion engine stops. Therefore, the piston can be prevented from stopping in the top dead center. The combustion of the fuel remaining in the intake pipe or combustion chamber due to the inflow air in opening the throttle valve can be prevented by stopping the ignition. From the viewpoint of the suppression of the vibration during stopping of the internal combustion engine, the throttle valve is preferably closed after the command for stopping the engine is issued and before the throttle valve is opened.

In one embodiment of the invention, the internal combustion engine includes an opening sensor that detects an opening degree of the throttle valve. The ignition stopping means stops the ignition based on the throttle opening degree detected by the opening sensor. For example, when the throttle opening degree reaches a predetermined value, or when the amount of change in throttle opening reaches a predetermined value, the throttle valve can be determined to be opened, responsive to which ignition may be stopped.

In another embodiment of the invention, the internal combustion engine includes a pressure sensor that detects a pressure in an intake pipe, and the ignition stopping means stops the ignition when the pressure detected by the pressure sensor becomes a predetermined value or more.

Further, in still another embodiment, the electronic control unit includes: a first ignition timing correction means for correcting ignition timing by feedback control so that the revolving speed of the internal combustion engine conforms to a target revolving speed; and a second ignition correction means for correcting the ignition timing according to the pressure in the intake pipe. Ignition is stopped in response to the second ignition timing correction means retarding the ignition timing advanced by the first ignition timing correction means.

In one embodiment of the invention, the ignition stopping means stops the ignition based on a change in target opening degree of the throttle valve. The burning can securely be avoided by stopping the ignition based on issuance of the command to open the throttle valve for controlling the piston stopping position, that is, based on change of target opening degrees of the throttle valve.

In still another embodiment, the device for controlling stopping of an internal combustion engine includes: a throttle valve that controls an intake air amount of the internal combustion engine; an actuator that drives the throttle valve; a revolving speed sensor that detects a revolving speed of the internal combustion engine; and an electronic control unit that controls the internal combustion engine. The electronic control unit includes: a first means, in response to a command for stopping the engine, for transmitting a signal to the actuator to drive the throttle valve to a predetermined opening lower than an opening degree during an idling and to maintain the throttle valve in the predetermined opening degree; a second means, subsequent to performance of the first means, for transmitting a signal to the actuator to drive the throttle valve to open more than the predetermined opening degree in order to control a piston stopping position; and means for stopping ignition of an ignition plug in response to change in opening degrees of the throttle valve from a predetermined opening degree.

When the command for stopping the engine is issued, the throttle valve is held at the predetermined opening degree (opening degree at which the valve is not fully closed) to suppress vibration, then, the throttle valve may be fully closed or moved to a closing side rather from the predetermined opening degree immediately before the throttle valve is opened to control the piston stopping position. At this point, responsive to detection of the throttle valve moved from the predetermined opening to the closing side, ignition is stopped.

In one embodiment of the invention, the ignition stopping means stops the ignition based on change in target opening degrees of the throttle valve from the predetermined opening degree. Therefore, burning can securely be avoided.

According to an aspect of the invention, a method is provided for controlling stopping of an internal combustion engine. The method includes: a step in which the electronic control unit, in response to a command for stopping the engine, transmits a signal for opening the throttle valve to the actuator in order to control a piston stopping position; and a step in which the electronic control unit stops ignition of an ignition plug when the throttle valve is opened in order to control the piston stopping position.

According to another aspect of the invention, a method is provided for controlling stopping of an internal combustion engine. the method includes: a step in which the electronic control unit, in response to a command for stopping the engine, transmits a signal to the actuator to drive the throttle valve to a predetermined opening degree lower than an opening degree during idling and to maintain the throttle valve in the predetermined opening degree; a step in which, subsequent to the step of transmitting signal to the actuator, the electronic control unit transmits a signal to the actuator to open the throttle valve more than the predetermined opening degree in order to control a piston stopping position; and a step in which the electronic control unit stops ignition of an ignition plug in response to change in opening degrees of the throttle valve from the predetermined opening.

BEST MODE FOR CARRYING OUT THE INVENTION

Figure 1:
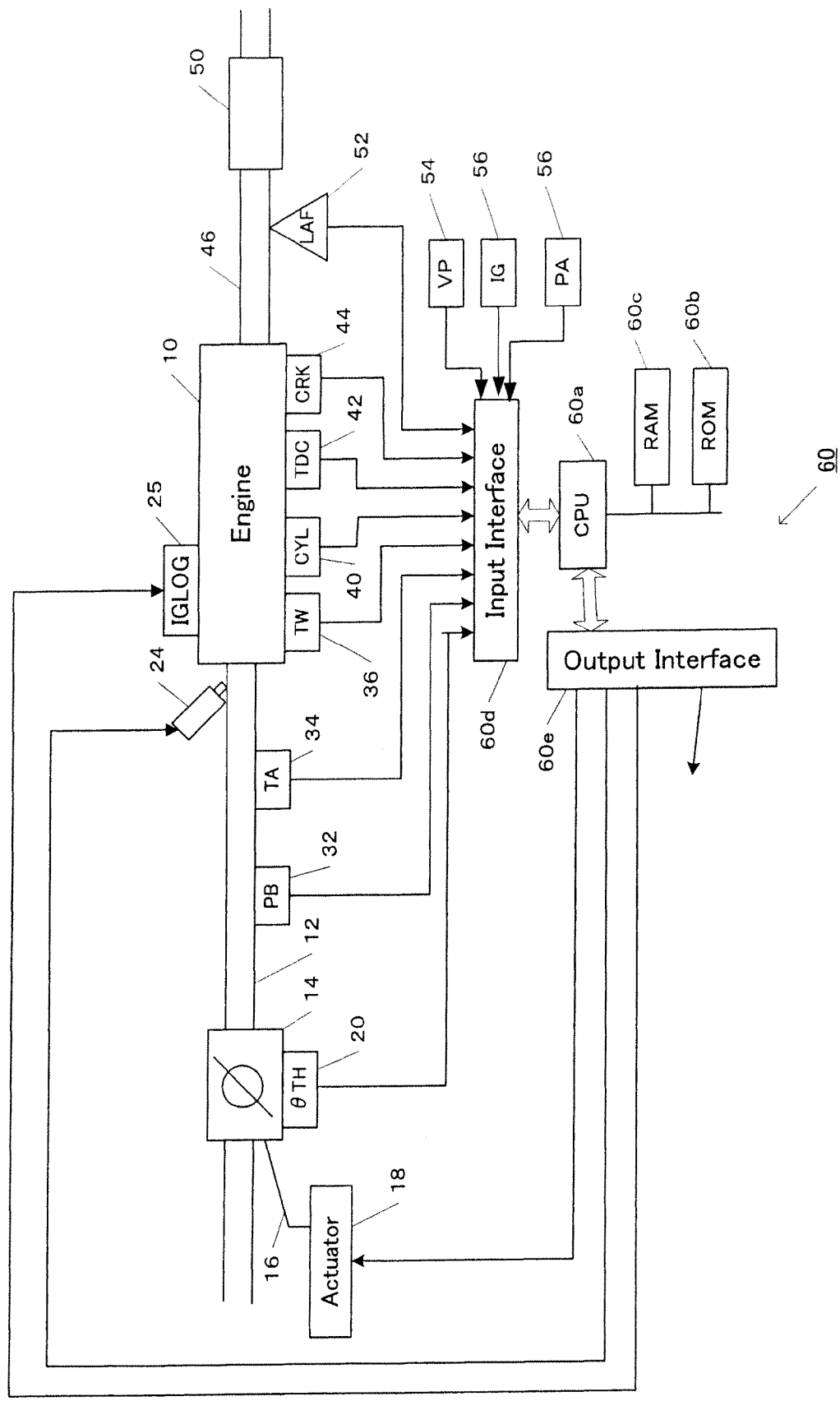
FIG. 1 is a block diagram illustrating an entire configuration of an idle revolving speed control device of an internal combustion engine.

An embodiment of the invention will be described below with reference to the drawings. FIG. 1 is a block diagram illustrating an entire configuration of a device for controlling a throttle valve during stopping of an internal combustion engine. For example, an engine 10 is a 4-cylinder automobile engine.

A throttle valve 14 is disposed in an intake pipe 12. The throttle valve 14 is driven by an actuator 18 in response to a control signal from an Electronic Control Unit (ECU) 60. In response to an output of a sensor for detecting an opening degree of an accelerator pedal (not illustrated), the ECU 60 transmits a control signal to the actuator 18 to control an opening degree of the throttle valve 14. This system is called a drive-by-wire system. As to another system, there is a system in which the throttle valve is directly controlled by an accelerator pedal with a wire connected to the accelerator pedal. A sensor 20 for detecting an opening degree of the throttle valve is provided near the throttle valve 14 to output a signal corresponding to an opening degree θTH of the throttle.

A fuel injection valve 24 is provided in each cylinder between the throttle valve 14 and an intake valve of the engine 10. The fuel injection valve 24 is connected to a fuel pump (not illustrated), and fuel is supplied from a fuel tank (not illustrated) via the fuel pump. The fuel injection valve 24 is driven in response to control signals from the ECU 60.

An igniter 25 is provided in each cylinder of the engine 10. The igniter 25 is driven by the ECU 60 in response to control signals controlling ignition timing IGLOG.

An intake pipe pressure sensor 32 and an intake air temperature sensor 34 are provided downstream of the throttle valve 14 of the intake pipe 12 to output an electric signal indicating an absolute pressure PB in an intake pipe and an electric signal indicating an intake air temperature TA, respectively.

A sensor for identifying cylinders (CYL) 40 is provided near a camshaft or a crankshaft of the engine 10. For example, the cylinder sensor 40 outputs a cylinder signal CYL at a predetermined crank angle position of a first cylinder. A TDC sensor 42 and a crank angle sensor (CRK) 44 are also provided. The TDC sensor 42 outputs TDC signals at a predetermined crank angle position corresponding to a piston top dead center (TDC) position of each cylinder, and the crank angle sensor 44 outputs a CRK signals at a crank angle (for example, 30 degrees) having a period shorter than that of the TDC signal.

An exhaust pipe 46 is connected to the engine 10. An emission gas generated by combustion is purified by a catalytic device 50 and exhausted to the outside. A broad air-fuel ratio (LAF) sensor 52 is provided upstream of the catalytic device 50 and outputs a signal proportional to an oxygen concentration in the emission gas in a wide range from lean to rich.

A vehicle speed sensor 54 is disposed near a drive shaft that drives a wheel of an automobile, and the vehicle speed sensor 54 outputs a signal in each predetermined rotation of the drive shaft. An ignition switch 55 is disposed in a driver's seat, and the ignition switch 55 starts and stops the engine and outputs an ON-signal or an OFF-signal. An atmospheric pressure sensor 56 is provided in the vehicle to output a signal corresponding to an atmospheric pressure.

The outputs of these sensors are transmitted to the ECU (Electronic Control Unit) 60. The ECU 60 includes a microcomputer. The ECU 60 includes a processor CPU 60a that performs computing, a ROM 60b in which a control program and a list, a table, and a map of various pieces of data are stored, and a RAM 60c in which a computing result of the CPU 60a is temporarily stored. The ECU 60 includes a nonvolatile memory in which data necessary for engine control in a next operation cycle is stored. The nonvolatile memory includes an EEPROM that is of a rewritable ROM or a RAM having a back-up function of supplying a retaining current to retain storage even if vehicle power supply is turned off.

The outputs of various sensors are input to an input interface 60d of the ECU 60. The input interface 60d includes a circuit that shapes an input signal to correct a voltage level and an A/D converter that converts an analog signal into a digital signal.

Using a counter, the CPU 60a counts the CRK signal from the crank angle sensor 44 to detect an engine revolving speed NE and counts the signal from the vehicle speed sensor 54 to detect a vehicle running speed VP. The CPU 60a performs the computing according to the program stored in the ROM 60b and transmits a driving signal to the fuel injection valve 24, the throttle valve actuator 18, and the like through an output interface 60e.

The ECU 60 has a function of performing feedback control of ignition timing according to a revolving speed and a load of the internal combustion engine. In the ignition timing feedback function, the ignition timing is adjusted such that an idle revolving speed is maintained during idling of the internal combustion engine. The ECU 60 transmits a signal indicating adjusted ignition timing IGLOG to the igniter 25 to drive the igniter 25. In the ignition timing feedback function, for example, as described in Patent Document 5, when an intake air amount decreases, the ECU 60 transmits a signal controlling the ignition timing IGLOG to the igniter 25 and advances the ignition timing with decreasing engine revolving speed NE. On the other hand, when the intake air amount increases, the ECU 60 retards the ignition timing with increasing engine revolving speed NE. As described in Patent Document 6, in order to prevent knocking, the ECU 60 transmits the signal controlling the ignition timing IGLOG to the igniter 25 to retard the ignition timing.

Figure 2:
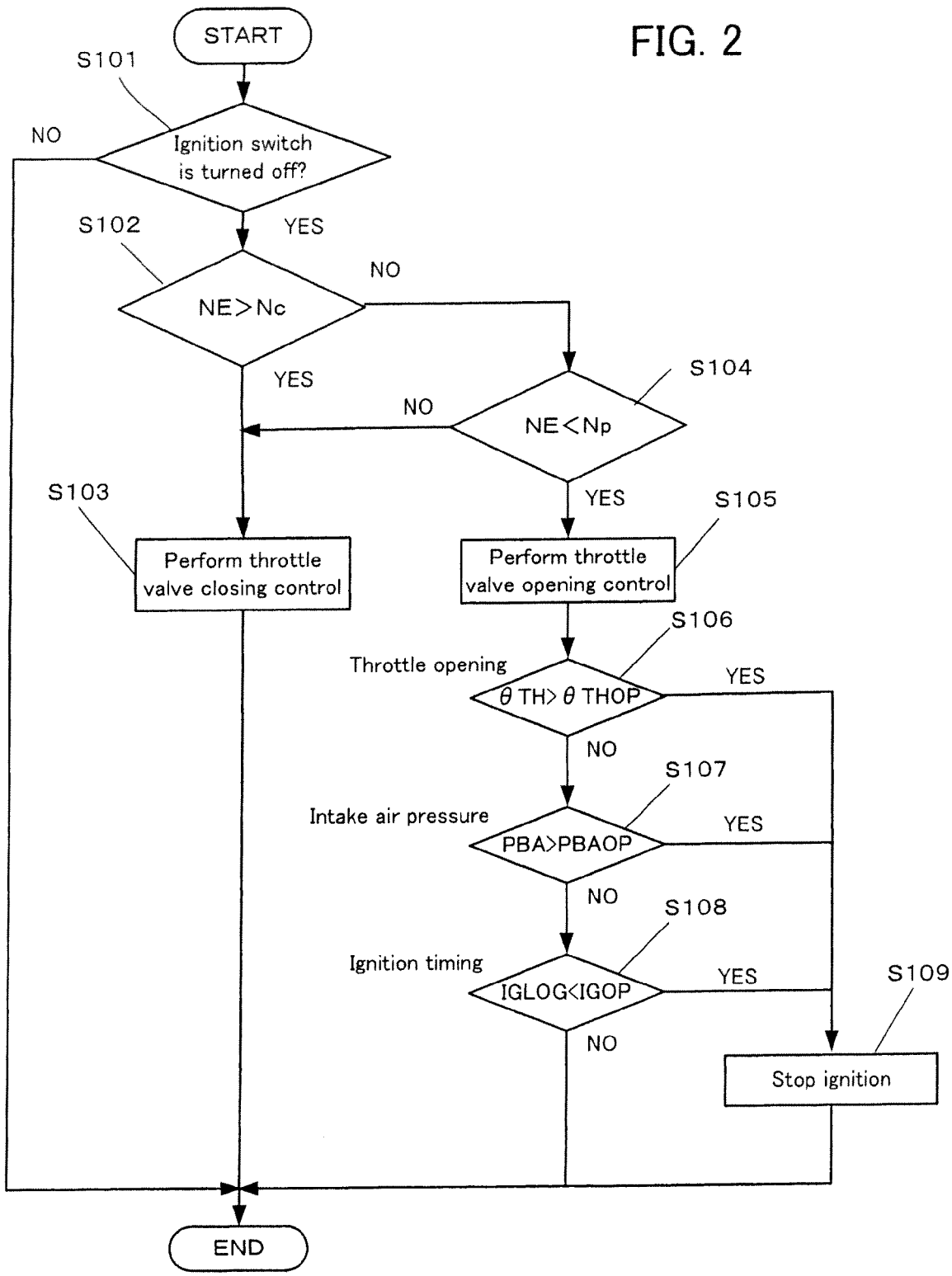
FIG. 2 illustrates a control flow of an engine stopping control process according to an embodiment of the invention.

FIG. 2 illustrates a control flow of an engine stopping control process according to an embodiment of the invention. The engine stopping control process is performed by the CPU 60a of the ECU 60. In the embodiment, the case in which the ignition switch 55 is turned off is described by way of example. However, a command for stopping the engine is not limited to the case in which the ignition switch 55 is turned off, but sometimes the command for stopping the engine automatically stops the engine during the idling. Obviously the invention can be applied to the case in which the engine is automatically stopped.

When the ignition switch 55 is turned off, the ECU 60 starts the engine stopping control process in response to the input of the OFF-signal accompanying the turn-off of the ignition switch 55 (YES in Step S101). Although the ECU 60 stops fuel injection control by the starting of the engine stopping control process, the ECU 60 continues ignition control, and the stopping of the ignition is performed during the engine stopping control process. When the ignition switch 55 is turned on, the engine stopping control process is ended (NO in Step S101).

In Step S102, the ECU 60 detects the cylinder discriminating signal CYL through the input interface 60d, counts the CRK signal from the crank angle sensor 44 in a specific cylinder using the counter, detects the engine revolving speed NE, and compares the engine revolving speed NE to a predetermined value Nc.

At this point, the predetermined value Nc is an engine revolving speed that becomes an initial threshold determining whether the throttle valve 14 is closed or opened. When the ignition switch 55 is turned off, the engine revolving speed NE gradually decreases. However, because the piston performs reciprocating motion through inertia even after the combustion is stopped, the reciprocating motion vibrates the engine. Therefore, as described in Patent Document 1, when the throttle valve 14 is closed, supply of intake air can be stopped to improve a vibration characteristic during the stopping of the engine. Until the engine revolving speed NE decreases to the predetermined value Nc from the engine revolving speed immediately after the ignition switch 55 is turned off (YES in Step S102), the ECU 60 transmits the signal to the actuator 18 to perform valve closing control of the throttle valve 14 (Step S103).

In Step S102, when the engine revolving speed NE is lower than the predetermined value Nc, the flow goes to a process of determining whether valve opening control of the throttle valve 14 is performed.

Figure 3:
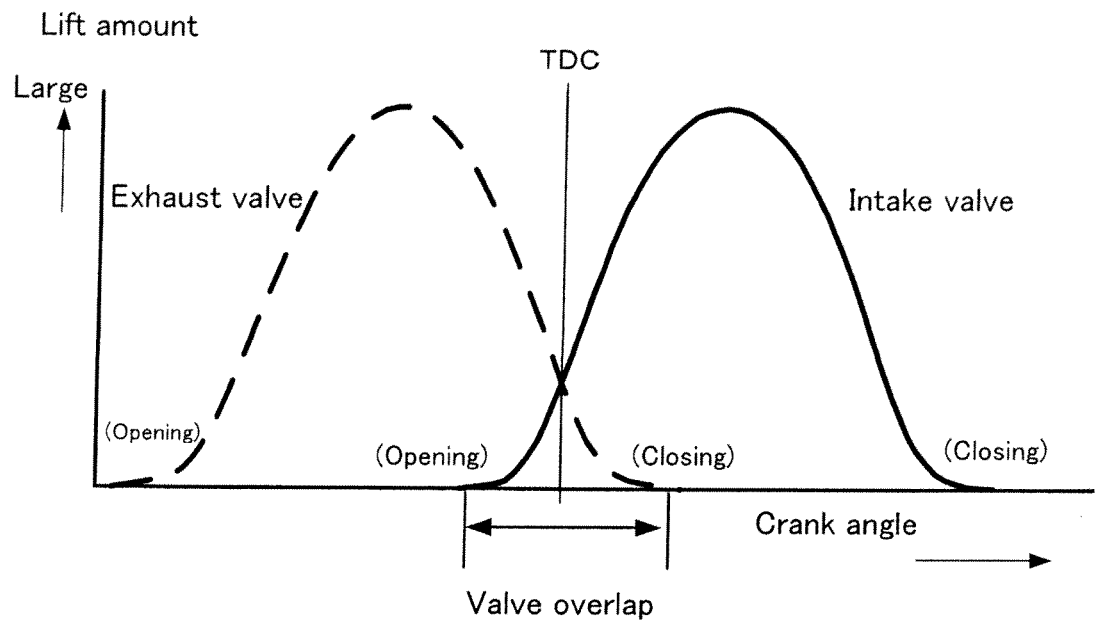
FIG. 3 is a view for explaining behaviors of an exhaust valve and an intake valve.

Before the detailed description of the process, an example of a determination technique will be described with reference to FIGS. 3 and 4. FIG. 3 is a view for explaining behaviors of the exhaust valve and the intake valve, and FIG. 4 is a view for explaining the engine revolving speed NE, the command of the ECU 60, and the opening and closing behavior of the throttle valve 14.

As illustrated in FIG. 3, a period during which the exhaust valve and the intake valve are simultaneously opened near the piston top dead center (TDC) is referred to as a valve overlap. The valve overlap is set such that an air-fuel mixture taken in as much as possible in order to improve the output of the engine. On the other hand, in order to improve engine startability, it is necessary to avoid the stopping of the piston near the top dead center such that the valve overlap is not generated during the stopping of the engine. A work amount of the piston, friction of the engine, the inertia of the engine, and the like are considered in order to avoid the stopping of the piston near the top dead center. As described in Patent Document 1, pressure rising of the intake pipe 12 is performed by the valve opening control of the throttle valve 14, which allows the piston to be prevented from being stopped near the top dead center.

However, when the throttle valve 14 is opened to introduce the air by hardware actuation and communication, timing at which the throttle valve is actually opened is delayed with respect to timing at which the ECU 60 issues the command to open the throttle valve. Therefore, sometimes the piston is stopped near the top dead center.

Figure 4:
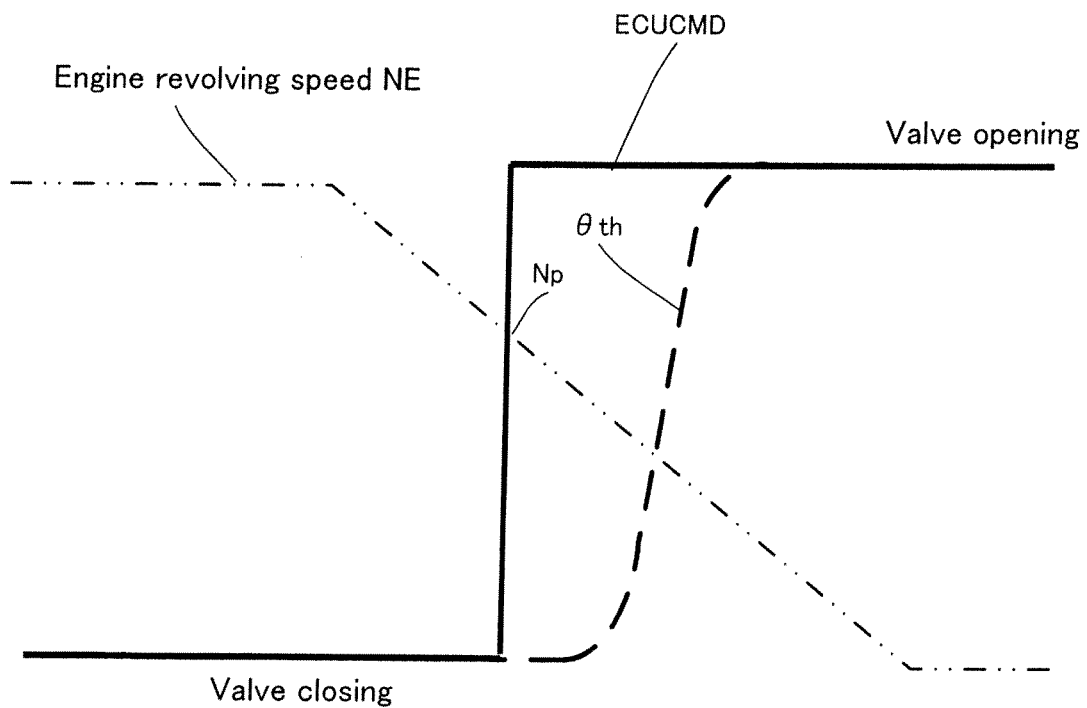
FIG. 4 is a view for explaining an engine revolving speed NE, a command of an ECU, and an opening and closing behavior of a throttle valve.

Referring to FIG. 4, when the ignition switch 55 is turned off, the ECU 60 closes the throttle valve 14, and the engine revolving speed NE indicated by an alternate long and two short dashes line gradually decreases. When the engine revolving speed NE becomes a predetermined value Np, the ECU 60 transmits a driving signal of a control command ECUCMD to open the throttle valve 14 to the actuator 18 through the output interface 60e. The predetermined value Np is set in consideration of a time necessary for a hardware operation to open the valve.

Although the actuator 18 drives the throttle valve 14, it is necessary to operate the hardware. Therefore, as illustrated in a behavior of a throttle valve opening θth illustrated in FIG. 4, a certain delay is generated until the throttle valve 14 is actually operated since the driving signal is transmitted. The predetermined value Np is set in consideration of the delay.

Referring to the process flow of FIG. 2, when the engine revolving speed NE is lower than the predetermined value Nc (NO in Step S102), the ECU 60 compares the engine revolving speed NE to the revolving speed Np that is of a threshold in order to determine whether the valve opening control of the throttle valve 14 is performed (Step S104). When the engine revolving speed NE is more than Np (NO in Step S104), the valve closing control of the throttle valve 14 is continuously performed (Step S103). When the engine revolving speed NE is lower than Np (YES in Step S104), the ECU 60 transmits the signal to the actuator 18 to perform the valve opening control of the throttle valve 14 (Step S105).

In Step S106, the ECU 60 obtains a signal of a throttle opening θTH, detected by the throttle opening sensor 20, and compares the throttle opening θTH to a predetermined value θTHOP. When the throttle opening θTH is more than the predetermined value θTHOP (YES in Step S106), the ECU 60 determines that the throttle valve 14 is opened, and the ECU 60 stops the ignition (Step S109). Alternatively, the ECU 60 computes an amount of change of the throttle opening, and the ECU 60 may determine that the throttle valve 14 is opened and stop the ignition when the amount of change exceeds a predetermined value.

As described in FIG. 4, the throttle valve 14 is opened behind after receiving the command signal from the ECU 60. Accordingly, the throttle valve 14 is not opened yet when the ECU 60 issues the command, in other words, the engine revolving speed NE satisfies a predetermined condition. When the ignition is stopped in this timing, unfortunately a large amount of uncombusted fuel remains. Therefore, in the embodiment, the valve is opened after the determination whether the throttle valve 14 is actually actuated.

When the throttle opening θTH is lower than the predetermined value θTHOP (NO in Step S106), the ECU 60 determines that the throttle valve 14 is not opened, and flow goes to Step S107. In Step S107, the ECU 60 obtains a signal of an intake air pressure PBA, detected by the intake air pressure sensor 32, and compares the intake air pressure PBA to a predetermined value PBAOP. When the intake air pressure PBA is more than the predetermined value PBAOP (YES in Step S107), the ECU 60 determines that the throttle valve 14 is opened to inlet the air, and the ECU 60 stops the ignition (Step S109).

The determination whether the throttle valve 14 is opened or closed is directly made in Step S106. On the other hand, in the determination in Step S107, the determination of the intake air pressure is made as an observation value based on the fact that intake air is directly necessary to combust the remaining fuel. While the throttle valve 14 is closed, the engine continuously rotates through inertia, and the air flows in an exhaust pipe direction. Therefore, the intake air pressure PBA in the intake pipe becomes a negative pressure. When the throttle valve 14 is opened, because the new air is inlet, the pressure rising is generated in the intake pipe. The increase in gas pressure means an increase in gas density, the change in intake air pressure PBA can become an index directly connected an increase in weight flow of the air necessary for the combustion. Therefore, in the embodiment, when the determination of the air inlet cannot be made only by the throttle valve opening that is of the mechanical detection value, the determination for the ignition stopping control is made by detecting the change in intake air pressure PBA.

When the intake air pressure PBA is lower than the predetermined value PBAOP (NO in Step S107), the ECU 60 determines that the throttle valve 14 is not opened and that the air amount necessary for the combustion is not taken in, and the flow goes to Step S108. In Step S108, the ECU 60 compares the ignition timing IGLOG to a predetermined value IGOP. When the ignition timing IGLOG is retarded with respect to the predetermined value IGOP (the ignition timing IGLOG is lower than the predetermined value IGOP by an inequality sign in FIG. 2) (YES in Step S108), the ECU 60 determines that the throttle valve 14 is opened and that the air is inlet to possibly increase the engine revolving speed NE, and the ECU 60 stops the ignition (Step S109).

In Step S108, the engine revolving speed NE, the atmospheric pressure, and other engine states, which are directly factors of the vibration degradation caused by after-burning immediately before the stopping, are observed to use a change of a control amount from the advance angle to the retard angle of the fed-back ignition timing, thereby making the ignition stopping determination.

As disclosed in Patent Documents 5 and 6, the ECU 60 includes first ignition timing correction means for correcting the ignition timing by feedback control such that the engine revolving speed NE becomes the target revolving speed and second ignition correction means for correcting the ignition timing according to the pressure PB in the intake pipe. The determination in Step S108 is made such that the ignition is stopped when the ignition timing becomes near the piston top dead center in response to the result that the ignition timing, advanced by the first ignition timing correction means, is retarded by the second ignition timing correction means.

Particularly, when the command for stopping the engine is issued to decrease the engine revolving speed NE, the ECU 60 performs control to compute a feedback correction amount (advance angle amount) of the ignition timing such that the engine revolving speed NE is returned to the target revolving speed using the first ignition timing correction means. As a result, the ignition timing is advanced with decreasing engine revolving speed NE. Then, for example, when the throttle valve 14 is opened to increase the pressure PB in the intake pipe, the ECU 60 performs control to compute a retard angle amount of the ignition timing in order to prevent the knocking using the second ignition timing correction means. As a result, the ignition timing is corrected onto the retard angle side with increasing pressure PB in the intake pipe. The burning is easily generated by the control because sometimes the ignition timing becomes near the piston top dead center. Therefore, in the determination, the prevention of the burning is achieved using the change in control amount from the advance angle to the retard angle of the ignition timing. The engine revolving speed NE and the like, which are of the direct factor of the vibration degradation caused by the after-burning, can be used in the determination, and therefore the determination can be made more correctly.

In the embodiment, in the control in which piston is not stopped in the top dead center during the stopping of the engine, the determination is made based on not the command of the engine revolving speed NE from the ECU 60 or the detection value of the engine revolving speed NE, but the observation amount close to the current status. Therefore, the time the ignition is stopped is delayed as much as possible. In the configuration of the embodiment, the remaining fuel is combusted and decreased as much as possible, and the ignition is stopped in the proper timing, so that the vibration degradation caused by the after-burning can be prevented.

As described above, the invention can provide the control device and method in which the engine is stopped without degrading the emission while the piston is stopped at the target stopping position to prevent the vibration degradation.

The embodiment of the invention is described above. The invention is not limited to the embodiment, but various modifications can be made without departing from the scope of the invention.

For example, in another embodiment, at the same time as the valve opening control of the throttle valve 14 is started (S105), namely, at the same time as the command ECUCMD (FIG. 4) to change the target opening of the throttle valve is issued, the ignition is stopped (S109).

In still another embodiment, when the command for stopping the engine is issued, the throttle valve is retained at the predetermined opening (opening at which the valve is not fully closed) to suppress the vibration in the throttle valve closing control in Step S103. Then, the throttle valve is fully closed or controlled to the closing side rather than the predetermined opening immediately before the throttle valve opening control (S105) is performed to control the piston stopping position. At this point, that the throttle valve is controlled from the predetermined opening onto the closing side is detected to stop the ignition.

In this case, in the embodiment, the ECU 60 stops the ignition in response to the change in target opening of the throttle valve from the predetermined opening for suppressing the vibration onto the closing side.

DESCRIPTION OF SYMBOLS 10 engine
12 intake pipe
14 throttle valve
20 throttle opening sensor
60 ECU

The invention claimed is:

1. A device for controlling stopping of an internal combustion engine, including a throttle valve that controls an intake air amount of the internal combustion engine, an actuator that drives the throttle valve, a revolving speed sensor that detects a revolving speed of the internal combustion engine, and an electronic control unit that controls the internal combustion engine, the electronic control unit being configured to:
  stop control of fuel injection valves with a command for stopping the internal combustion engine;
  continue ignition control of ignition plugs after the control of the fuel injection valves is stopped;
  transmit signals to the actuator for opening the throttle valve to control a stopping position of a piston after the command for stopping the engine is transmitted and when the revolving speed of the internal combustion engine becomes lower than a predetermined revolving speed;
  stop ignition of an ignition plug when the throttle valve is opened to control the piston stopping position, wherein the electronic control unit is further configured to:
  perform a first correction of ignition timing by feedback control such that the revolving speed of the internal combustion engine becomes a target revolving speed; and
  perform a second correction of ignition timing according to a pressure in an intake pipe, and
wherein the ignition is stopped in response to the ignition timing being retarded by the second correction due to an increase of the pressure in the intake pipe resulted from the throttle valve being opened to control a piston stopping position, after the ignition timing is advanced by the first correction.

2. The device according to claim 1, wherein the internal combustion engine includes an opening sensor that detects an opening of the throttle valve, and the electronic control unit being further configured to stop the ignition based on the throttle opening detected by the opening sensor.

3. The device according to claim 1, wherein the internal combustion engine includes a pressure sensor that detects a pressure in an intake pipe, and the electronic control unit being further configured to stop the ignition when the pressure detected by the pressure sensor becomes a predetermined value or more.

4. The device according to claim 1, the electronic control unit being configured to:
  stop ignition based on change in target opening degrees of the throttle valve when the throttle valve is opened to control the piston stopping position.

5. The device according to claim 1, the electronic control unit being configured to:
  transmit a signal to the actuator such that the throttle valve is moved to a predetermined opening lower than an opening during an idling and such that the throttle valve is maintained in the predetermined opening in response to a command for stopping the engine;
  transmit a signal to the actuator such that the throttle valve is opened more than the predetermined opening in order to control a piston stopping position after performance of transmitting a signal to the actuator such that throttle valve is moved to the predetermined opening; and
  stop ignition of an ignition plug in response to a change in opening of the throttle valve from the predetermined opening.

6. The device according to claim 5, wherein the ignition is stopped based on a change in target opening of the throttle valve from the predetermined opening.

7. A method for controlling stopping of an internal combustion engine including a throttle valve that controls an intake air amount of the internal combustion engine, an actuator that drives the throttle valve, a revolving speed sensor that detects a revolving speed of the internal combustion engine, and an electronic control unit that controls the internal combustion engine, the electronic control unit performing the steps of:
  stopping control of fuel injection valves with a command for stopping the internal combustion engine;
  continuing ignition control of ignition plugs after the control of the fuel injection valves is stopped;
  transmitting signals to the actuator for opening the throttle valve to control a stopping position of a piston after the command for stopping the engine is transmitted and when the revolving speed of the internal combustion engine becomes lower than a predetermined revolving speed;

stopping ignition of ignition plugs when the throttle valve is opened in order to control the piston stopping position;

determining an advance angle amount of ignition timing by feedback control such that the revolving speed of the internal combustion engine becomes a target revolving speed; and determining a retard angle amount of the ignition timing according to a pressure in an intake pipe;

wherein the step of stopping ignition stops the ignition in response to the ignition timing being retarded by the retard angle amount due to an increase of the pressure in the intake pipe resulted from the throttle valve being opened to control a piston stopping position, after the ignition timing is advanced by the advance angle amount.

8. The method according to claim 7, wherein the internal combustion engine includes a sensor for detecting an opening degree of the throttle valve, and the step of stopping ignition includes the step of stopping ignition based on the throttle opening degree detected by the sensor for detecting an opening degree.

9. The method according to claim 7, wherein the internal combustion engine includes a pressure sensor that detects a pressure in an intake pipe, and wherein the step of stopping ignition includes the step of stopping the ignition when the pressure detected by the pressure sensor becomes a predetermined value or more.

10. The method according to claim 7, the electronic control unit performing the steps of:

stopping the ignition based on a change in target opening degree of the throttle valve.

11. The method according to claim 7, the internal combustion engine performing the steps of:

transmitting signals to the actuator to move the throttle valve to a predetermined opening degree lower than an opening during idling and such that the throttle valve is maintained in the predetermined opening degree in response to a command for stopping the engine;

transmitting signals to the actuator to open the throttle valve a larger degree than the predetermined opening degree in order to control a piston stopping position after the step of transmitting signals to the actuator to move the throttle valve; and stopping ignition of ignition plugs in response to change in opening degree of the throttle valve from the predetermined opening degree.

12. The method according to claim 11, wherein the step of stopping ignition includes the step of stopping the ignition based on change in target opening degree of the throttle valve from the predetermined opening degree.

\* \* \* \* \*